United States Patent [19]

Mallow, Sr. et al.

[11] Patent Number: 5,725,009
[45] Date of Patent: Mar. 10, 1998

[54] FITTING REMOVAL FLUID DISCHARGE BAG

[76] Inventors: Ramon D. Mallow, Sr., 4302 McNeil St., Dallas, Tex. 75227; Roger B. Batsel, Sr., 1302 Batsel Dr., Bowling Green, Ky. 42103

[21] Appl. No.: 767,934

[22] Filed: Dec. 17, 1996

[51] Int. Cl.⁶ ............................ F16K 43/00; F16L 35/00
[52] U.S. Cl. ............... 137/15; 24/300; 137/312; 137/317; 137/375; 137/377; 312/1; 383/38; 383/67; 383/113; 383/906
[58] Field of Search .................... 137/15, 312, 315, 137/317, 375, 377; 312/1, 3; 383/38, 67, 113, 906; 24/300, 301, 482

[56] References Cited

U.S. PATENT DOCUMENTS

| | | | |
|---|---|---|---|
| 2,435,743 | 2/1948 | Geimer | 383/113 |
| 3,122,158 | 2/1964 | Grunsky | 137/317 |
| 3,148,690 | 9/1964 | Petersen | 137/317 |
| 3,148,699 | 9/1964 | Shindler | 137/312 |
| 3,645,822 | 2/1972 | Widiger et al. | 383/113 |
| 4,159,721 | 7/1979 | Horter | 137/317 |
| 4,207,918 | 6/1980 | Burns et al. | 137/375 |
| 4,327,760 | 5/1982 | Lancaster | 312/1 |
| 4,373,547 | 2/1983 | Geis et al. | 312/1 |
| 4,475,241 | 10/1984 | Mueller et al. | 383/113 |
| 4,556,082 | 12/1985 | Riley et al. | 137/375 |
| 4,626,291 | 12/1986 | Natale | 312/1 |
| 4,648,121 | 3/1987 | Lowe | 383/113 |
| 4,783,129 | 11/1988 | Jacobson | 312/1 |
| 4,812,700 | 3/1989 | Natale | 312/1 |
| 4,883,329 | 11/1989 | Flannery et al. | 312/1 |
| 4,934,763 | 6/1990 | Jacobons | 312/1 |
| 5,062,871 | 11/1991 | Lemon, III | 312/1 |
| 5,161,895 | 11/1992 | Myers | 383/113 |
| 5,299,591 | 4/1994 | Duncan | 137/15 |
| 5,368,395 | 11/1994 | Crimmins | 383/113 |

*Primary Examiner*—George L. Walton
*Attorney, Agent, or Firm*—David W. Quimby

[57] ABSTRACT

A device for containing and redirecting fluid which is released when a fitting is removed from an end of a pipe is attached to a pipe after the connection between the pipe and the fitting has been loosened. The device comprises a bag which has an opening in the top of the bag. The opening allows the bag to be placed over the fitting that is to be removed. The bag has a plurality of adjustment straps which connect to an upper portion and a lower portion of the bag. When the adjustment straps are adjusted, slack is formed in the material of the bag between upper and lower ends of the adjustment straps. The slack thus formed allows the fitting within the bag to be manipulated so that the fitting can be removed from the pipe. Fluid discharged from the pipe upon removal of the fitting is contained within the bag or directed through a hose to a receptacle or drain.

19 Claims, 2 Drawing Sheets

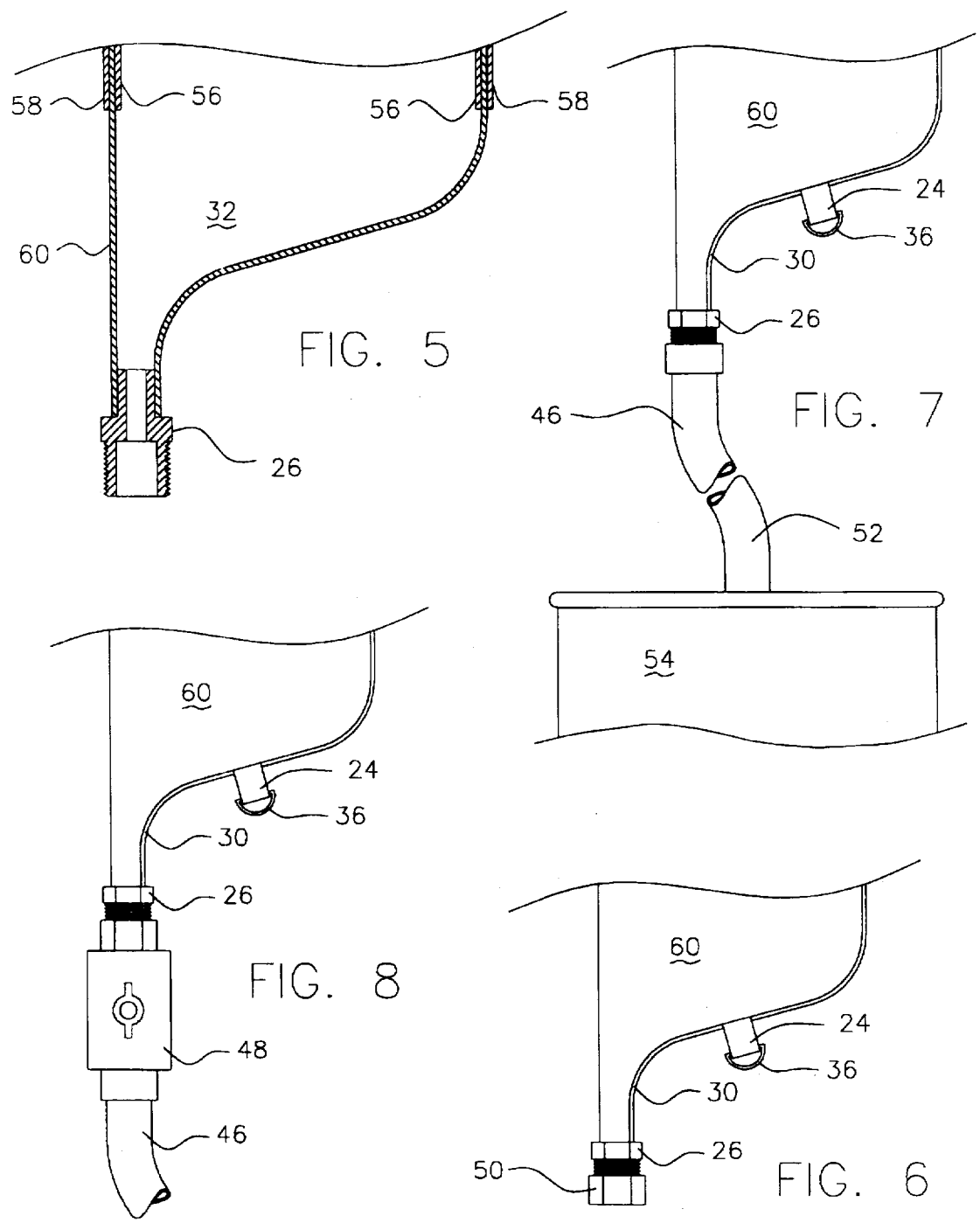

FITTING REMOVAL FLUID DISCHARGE BAG

BACKGROUND OF THE INVENTION (1) Field of the Invention

This invention relates to a device for aiding in the removal of fittings from a piping system, and more particularly to a device for containing or redirecting fluid which is released when a pipe fitting is removed.

(2) Description of Related Art

Many piping systems are comprised of a main fluid supply pipe with a plurality of drop pipes off of the main supply pipe. A fitting is generally connected to an end of each of the drop pipes. A common example of this type of system is an overhead fire sprinkler system in a building. In this type of system, the main supply pipe is the water pipe and the fittings are sprinkler heads. The water pipe has a plurality of drop pipes, and at an end of each of the drop pipes is a sprinkler head.

Sometimes it is necessary to change a fitting at the end of a drop pipe. To do this, the fluid supply to the main supply pipe is turned off and, as much as possible, the main supply pipe is drained. After the main supply pipe has been drained, there is still fluid in each of the drop pipes of the system. Also, several gallons of fluid can be retained in the main supply pipe even after the main supply pipe has been drained as much as possible. When the fitting at the end of a drop pipe is removed, the fluid held above the fitting in the drop pipe is released. In water systems, the fluid released from the drop pipe when the fitting is removed is often a stagnant fluid containing rust, sulfur compounds, and metal filings. Often, a component of the stagnant fluid is dissolved hydrogen sulfide. If the stagnant fluid is not contained when the fitting is removed, the hydrogen sulfide will diffuse in the air, producing an offensive smelling work environment.

It is desirable to prevent discharge fluid from a drop pipe from contacting workers removing the fitting, from contacting the area below the drop pipe, and from causing undesirable odors in the work environment. A prior art method for preventing discharge fluid from a drop pipe from contacting the area below the drop pipe is to hold a bucket below the fitting while removing the fitting from the drop pipe. This method is unwieldy and does little to prevent the fluid from spraying and splattering on the worker removing the fitting and the surrounding area.

U.S. Pat. No. 3,148,699, issued to Schindler, describes a complex containment area device for containment of radioactive or toxic materials during repair of a piping system. The device comprises a containment bag which has continuous separable fastener elements for joining the containment bag about a longitudinal section of a piping system that is to be worked on. The containment bag is sealingly connected to the piping system at each end of the containment bag. The device has an inflatable chamber which gives shape to the enclosure to facilitate work done within the containment device. A series of sleeves located in the body of the device allow for manipulation of items within the containment device. Similar devices for aiding in the removal of asbestos insulation from pipe systems are shown in U.S. Pat. No. 5,062,871, issued to Lemon; U.S. Pat. No. 4,883,389, issued to Flannery et al.; U.S. Pat. No. 4,783,129, issued to Jacobson; and U.S. Pat. No. 4,632,291, issued to Natale.

U.S. Pat. No. 5,299,591, issued to Duncan, describes a device and method for containing spillage from leaks above suspended ceilings. The device comprises a receptacle which is suspended from the ceiling below the drainage point of the leak. A hose operatively connected in the bottom of the receptacle allows the drainage to be directed to a desired location. This device prevents spillage of leaks but does not allow manipulation of or access to the cause of the leak.

SUMMARY OF THE INVENTION (1) Progressive Contribution to the Art

We have invented a portable container for trapping fluid discharge from a pipe when a fitting at an end of the pipe is removed. The container comprises a bag which is placed around the fitting and attached to the pipe. The bag has a plurality of adjustment straps which are attached to the outside of the bag between upper and lower attachment points. When the adjustment straps are adjusted, slack is formed in the bag between the upper and lower attachment points. The slack allows a fitting within the bag to be easily manipulated by application of force to the fitting through the walls of the bag.

To use the container, the connection between the fitting and the pipe is broken loose by means of appropriate tools. The connection is loosened so that further removal can be accomplished by hand manipulation. Then the bag is placed around the fitting and positioned such that the fitting is located between the upper and lower attachment points of the bag. The bag is secured to the pipe and slack is created in the bag by adjusting the adjustment straps. Then, the fitting is removed by hand manipulation of the fitting through the material of the bag. When removed, the fitting can be guided to the bottom of the bag. After the fitting has been removed, the bag can be removed from the pipe and the fluid in the bag can be properly disposed of.

In an alternate embodiment of the invention, a connector is located in the bottom of the bag. The connector allows a hose, or a valve and a hose, to be connected to the bag. The hose allows fluid released when the fitting is removed to be directed to a desired location. The valve allows the user to control the rate of fluid flow from the bag.

(2) Objects of this Invention

An object of this invention is to provide a simple device for redirecting and containing fluid released upon removal of a fitting from an end of a pipe.

Another object is to provide a discharge bag for fluid released upon removal of a fitting from a pipe that does not require sleeves to be attached to the body of the bag to allow for manipulation of objects within the bag.

Another object is to provide a discharge bag that allows discharge fluid released when a fitting is removed to be guided to a desired location.

Another object is to prevent discharge fluid from a drop pipe from contacting workers removing the fitting, from contacting the area below the drop pipe, and from causing undesirable odors in the work environment.

Further objects are to achieve the above with a device which is sturdy, compact, durable, light-weight, simple, safe, efficient, versatile, ecologically compatible, energy conserving and reliable; yet is inexpensive and easy to manufacture, install, maintain and use.

Another object is to provide a method for containing and/or redirecting fluid released upon removal of a fitting from an end of a drop pipe.

Other objects are to achieve the above with a method that is rapid, versatile, ecologically compatible, energy conserving, efficient, inexpensive, and does not require highly skilled people to install, maintain or use.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 5 is a sectional view of the bottom of a fluid discharge bag which has a connector attached to the bottom of the bag.

FIG. 6 is a partial elevational view of a fluid discharge bag which has a connector attached to the bottom of the bag showing a cap connected to the connector.

FIG. 7 is a partial elevational view of a fluid discharge bag which has a connector attached to the bottom of the bag showing a hose connected to the connector.

FIG. 8 is a partial elevational view of a fluid discharge bag which has a connector attached to the bottom of the bag showing a valve and a hose connected to the connector.

Figure 1:
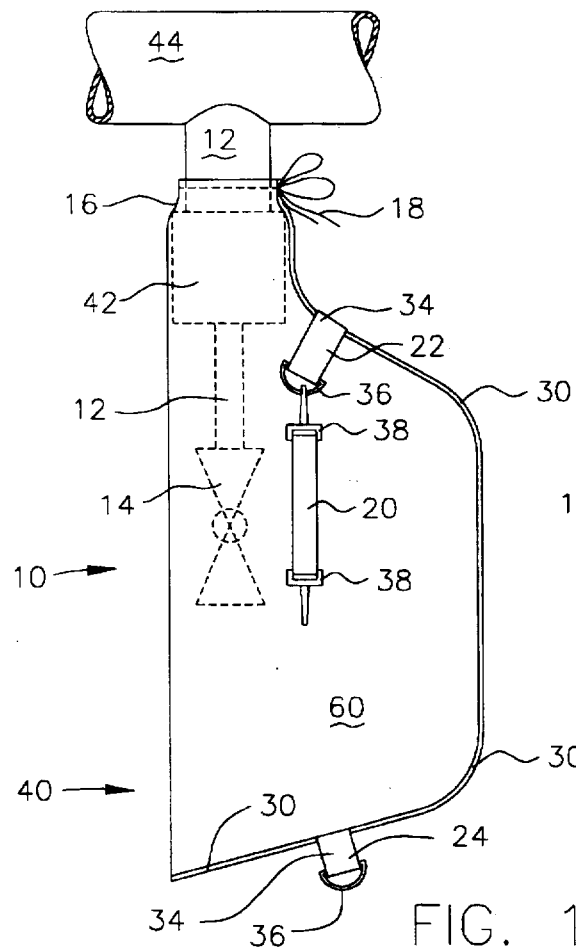
FIG. 1 is an elevational view of a fluid discharge bag attached to a pipe without the adjustable straps forming slack in the bag.

As an aid to correlating the terms of the claims to the exemplary drawings the following catalogue of elements is provided:

10 fluid discharge bag
12 piping system
14 fitting
16 draw string collar
18 draw string
20 adjustment strap
22 upper strap connector
24 lower strap connector
26 connector
28 grommet
30 bag seam edge
32 inside surface
34 strap
36 "D" ring
38 harness snap
40 bottom portion
42 reducing coupling
44 main fluid supply pipe
46 hose
48 valve
50 cap
52 hose discharge end
54 container
56 additional inside surface layer
58 additional outside surface layer
60 bag outside surface

DESCRIPTION OF THE PREFERRED EMBODIMENTS

With reference to the drawings, a fluid discharge bag is designated generally as 10. The fluid discharge bag is used to redirect and contain fluid flow from piping system 12 when fitting 14 attached to the piping system is removed. As shown in the figures, the bag 10 has draw string collar 16 with draw string 18 located at a top end of the bag. Also, the bag 10 has at least two adjustment straps 20 which are attached to the bag at upper strap connector 22 and lower strap connector 24. The bag can have a closed bottom, as shown in FIG. 1, or the bag can have connector 26 sealingly attached to the bottom of the bag as shown in FIGS. 5–8.

The bag 10 should be made of a flexible, resilient material that is impermeable to the fluid that will be discharged into the bag. For systems where the discharge fluid is primarily water, 400 denier pack cloth is a preferred material. The bag 10 is preferably formed from a single material blank (not shown). The draw string 18 is placed in grommets (not shown) at the top of the bag, and approximately 2 inches of the bag material is folded down and sewn to form the draw string collar 16. Then, the bag blank is folded over and sealed along seam edge 30 of the bag. This forms a bag 10 which has only one outside seam 30. The seam 30 can be formed by sewing the bag 10 together, or by fusing the material of the bag together.

To improve the fluid retention properties of the bag 10, inside surface 32 of the bag can be coated with a material that is impermeable to the fluid that will be discharged into the bag. For systems where the discharge fluid is primarily water, the inside surface 32 of the bag 10 can be coated with a water resistant polymeric coating, such as a vinyl coating. Such sealants are commonly available.

Figure 3:
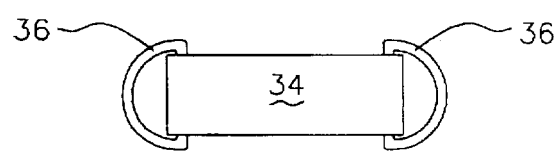
FIG. 3 is an elevational view of a strap connector.

As shown in FIG. 3, the upper strap connector 22 and the lower strap connector 24 are comprised of straps 34 which have "D" rings 36 at each end of the strap. The straps 34 are permanently attached to the bag 10 at the seam edge 30 of the bag so that one half of the strap is on each side of the bag.

Figure 2:
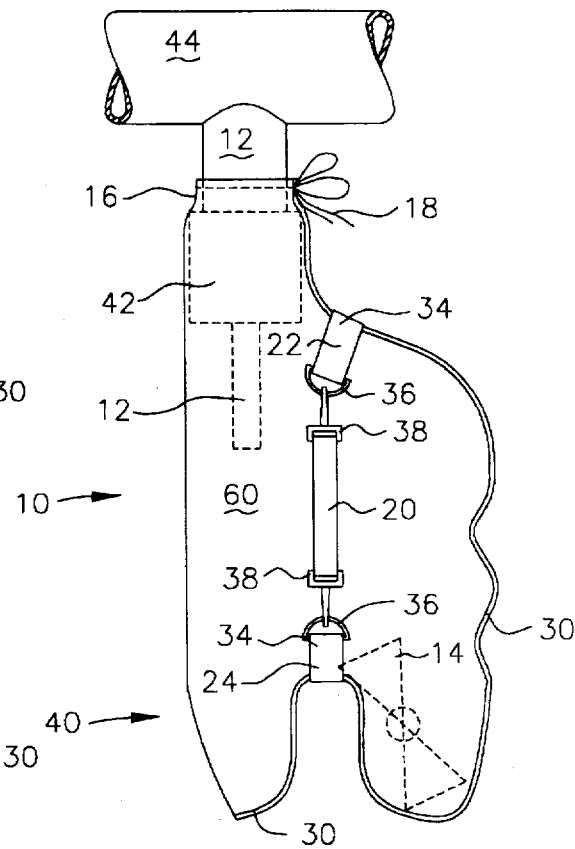
FIG. 2 is an elevational view of a fluid discharge bag with the fitting removed and resting in the bottom of the bag.
Figure 4:
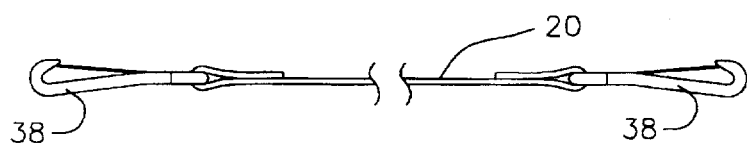
FIG. 4 is an elevational view of a adjustment strap.

FIG. 4 shows an adjustment strap 20. An adjustment strap 20 has harness snaps 38 on each end of the adjustment strap. When the harness snaps 38 are attached to the "D" rings 36 of the upper and lower strap connectors 22, 24, bottom portion 40 of the bag 10 is raised upwards. This forms slack in the bag 10 between the upper and lower strap connectors 22, 24, as shown in FIG. 2.

As shown in FIG. 1, the bag 10 is attached to piping system 12 above fitting 14. The bag 10 is positioned on the piping system 12 so that the fitting 14 to be removed is below the upper strap connector 22. The bag 10 is then attached to the piping system 12. As shown in FIG. 1, the bag 10 is attached to the piping system 12 directly above reducing coupling 42 by means of the draw string 18. Alternatively, the bag 10 could be taped to the piping system 12 or attached by VELCRO connectors (not shown). The attachment between the piping system 12 and the bag 10 does not have to be air tight, but the attachment does have to support the weight of the bag, the weight of any fluid in the bag, and the weight of the fitting 14 after the fitting has been removed from the piping system. If additional support for the bag 10 is required, external ties (not shown) can be attached to a structural element, such as main fluid supply pipe 44, and to the strap connector "D" rings 36.

FIGS. 5 through 8 show an alternative embodiment of the bottom portion 40 of the fluid discharge bag 10. The bag 10 has connector 26 mounted in the bottom of the bag. Typically, the connector 26 is a male threaded fitting which allows an attachment to be fastened to the bag 10. The connector 26 is sealed in the bottom of the bag 10 with a silicon rubber sealant. The connector allows hose 46, or valve 48 and hose 46, to be attached to the bag 10.

Alternatively, a cap 50 can be connected to the connector 26 if a hose 46 is not needed. The bag 10 with a hose 46 connected to the connector 26, or to valve 48, can be used when a high volume of fluid is likely to discharge from the piping system 12 when the fitting 14 is removed. In such a case, discharge end 52 of hose 46 can be positioned in a drain or in container 54 having sufficient volume to hold the discharged fluid. Valve 48 allows the rate of fluid discharge from the bag to be controlled. Alternatively, the fluid discharge bag 10 can be formed with a hose 46, or with a valve 48 and hose, permanently attached and sealed to the bottom of the bag (not shown).

The material of the bag 10 between the upper strap connector 22 and the lower strap connector 24 is used to manipulate a fitting within the bag. An additional layer 56 of material can be added to the inside surface 32 of the bag 10 between the upper and lower strap attachment points 22, 24 to provide extra strength to the bag. It may also be desirable to provide an additional layer 58 of material on the outside surface 60 of the bag 10 between the upper and lower strap attachment points 22, 24 if it is known that tools will be used on the outside surface of the bag to aid with the removal of a fitting 14 from a piping system 12. FIG. 5 shows a fluid discharge bag 10 which has additional inside surface and outside surface layers 56, 58.

To use the fluid discharge bag 10, the connection between the fitting 14 to be removed and the piping system 12 is broken loose with appropriate tools (not shown). Typically, this involves using a wrench or wrenches to break free a threaded connection between the piping system 12 and the fitting 14. The connection should be loosened so that further removal requires either hand manipulation or the application of a small amount of force with a tool. The fitting 14 should not be loosened so much that fluid leaks from the piping system 12.

After the connection between the fitting 14 and the piping system 12 has been loosened, the bag is positioned over the fitting and the draw string 18 is tightened and tied. The adjustment straps 20 are attached to the upper and lower strap connectors 22, 24 to form slack in the bag 10. If a bag 10 with a hose 46 is used, the discharge end 52 of the hose should be positioned in a drain or in a container 54 that will hold the fluid discharge. The fitting 14 is then removed from the piping system 12 by manipulating the fitting through the material of the bag 10. If further tool manipulation is required to remove the fitting 14 from the piping system 12, special care should be taken not to damage or rip the bag 10 while applying force to the fitting through the material of the bag. When the fitting 14 is removed, the fitting can be guided to the bottom of the bag 10.

Then, the bag 10 is securely grasped and the bag is removed from the piping system 12. The fluid in the bag 10 can be disposed of properly and the fitting 14 removed from the bag.

The embodiments shown and described above are only exemplary. We do not claim to have invented all the parts, elements, or steps described. Various modifications can be made in the construction, material, arrangement, and operation, and still be within the scope of our invention. For example, the attachment straps are described above as comprising a strap with harness snaps attached to both ends of the strap. The harness snaps attach to "D" rings which are permanently attached to the bag. It should be noted that any type of strap which is capable of raising a bottom portion of the bag towards a top portion of the bag, thus forming slack in the bag, could be used.

The restrictive description and drawings of the specific examples above do not point out what an infringement of this patent would be, but are to enable one skilled in the art to make and use the invention. The limits of the invention and the bounds of the patent protection are measured by and defined in the following claims.

We claim as our invention:

1. A method for removing a fitting from an end of a piping system while containing and redirecting fluid discharge from the pipe system comprising:
    a) breaking loose a connection between a fitting and a piping system;
    b) enclosing the fitting in a bag made of a resilient flexible material;
    c) attaching the bag to the piping system;
    d) forming slack in the material of the bag between an upper portion of the bag and a lower portion of the bag by adjustment of straps which connect the upper portion of the bag to the lower portion of the bag to allow for manipulation of the fitting within the bag; and
    e) removing the fitting from the piping system by manipulation of the connection between the fitting and the piping system through the material of the bag.

2. The method as defined in claim 1 wherein said bag has a hose operatively connected to the bottom portion of the bag for directing discharge fluid released upon removal of the fitting to a desired location.

3. The method as defined in claim 1 wherein said bag has a valve operatively connected to the bottom portion of the bag for controlling discharge rate of fluid from said bag; and a hose operatively connected to said valve for directing discharged fluid to a desired location.

4. An apparatus for containing and redirecting fluid discharge from a pipe system comprising:
    a) a bag made of a flexible material, said bag having an inside surface, an outside surface, and a top opening;
    b) attachment means at the top opening of the bag for attaching the bag to a pipe system to enclose a fitting; and
    c) a plurality of adjustable straps attached to the bag at an upper strap attachment point and lower strap attachment point; wherein
    d) adjustment of said plurality of straps raises a bottom portion of the bag towards an upper portion of the bag to create slack in the bag and allow the fitting within the bag to be removed from the pipe system by manipulation of the fitting through the material of the bag, said bag containing and directing fluid within the pipe system to the bottom portion of the bag when the fitting is removed.

5. The apparatus as defined in claim 4 wherein said plurality of straps comprise:
    e) a plurality of upper connectors attached to the outside surface of the bag;
    f) a plurality of lower connectors attached to the outside surface of the bag below the upper connectors; and
    g) a plurality of adjustment straps, each adjustment strap of said plurality of adjustment straps is removably attachable to an upper connector and a lower connector.

6. The apparatus as defined in claim 4 wherein said inside surface of said bag is coated with a polymeric coating.

7. The apparatus as defined in claim 4 wherein an additional layer of bag material is located on the inside surface of the bag between the upper strap attachment point and the lower strap attachment point.

8. The apparatus as defined in claim 7 wherein an additional layer of bag material is located on the outside surface of the bag between the upper strap attachment point and the lower strap attachment point.

9. The apparatus as defined in claim 7 wherein said inside surface of said bag is coated with a polymeric coating.

10. The apparatus as defined in claim 4 wherein an additional layer of bag material is located on the outside surface of the bag between the upper strap attachment point and the lower strap attachment point.

11. The apparatus as defined in claim 4 wherein said attachment means comprises a draw string operably connected at the top opening of the bag.

12. The apparatus as defined in claim 4 further comprising:
   e) a hose sealingly connected to an opening in a bottom of the bag.

13. The apparatus as defined in claim 4 further comprising:
   e) a connector sealingly connected to an opening in a bottom of the bag; and
   f) a hose removably attached to the connector.

14. The apparatus as defined in claim 4 further comprising:
   e) a connector sealingly connected to an opening in a bottom of the bag; and
   f) a cap removably attached to the connector.

15. The apparatus as defined in claim 4 further comprising:
   e) a connector sealingly connected to an opening in a bottom of the bag;
   f) a valve removably attached to the connector; and
   g) a hose attached to the valve.

16. A device for containing and directing fluid comprising:
   a) a bag made of a flexible material, said bag having an inside surface, an outside surface, and a top opening;
   b) a collar at the top opening of the bag;
   c) a draw string in working relation to said collar for attaching the bag to a pipe so that a fitting attached to the pipe is within the bag;
   d) a vinyl coating on said inside surface of the bag;
   e) a plurality of adjustable straps attached to the outside surface of the bag, each of said straps attached to the bag at an upper strap attachment point and at a lower strap attachment point, wherein
   f) adjustment of the adjustable straps forms slack in the bag material between the upper strap attachment point and the lower strap attachment point which allows the fitting within the bag to be removed from the pipe by manipulation of the fitting through the bag material; and
   g) a connector attached to the bottom of the bag at an opening in the bottom of the bag.

17. The device as defined in claim 16 further comprising a cap removably attached to said connector.

18. The device as defined in claim 16 further comprising a hose removably attached to said connector.

19. The device as defined in claim 16 further comprising:
   h) a valve removably attached to said connector; and
   i) a hose removably attached to said valve.

* * * * *